(12) United States Patent
Kaneko

(10) Patent No.: US 6,377,826 B1
(45) Date of Patent: Apr. 23, 2002

(54) CHARGING SYSTEM OF MOBILE TELEPHONE

(75) Inventor: Yasuhiro Kaneko, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/276,937

(22) Filed: Mar. 26, 1999

(30) Foreign Application Priority Data

Mar. 27, 1998 (JP) .............................. 10-098276

(51) Int. Cl.[7] .............................. H04B 1/38; H04M 1/00
(52) U.S. Cl. ...................................... 455/573; 455/566
(58) Field of Search ................................ 455/566, 550, 455/571, 572, 573, 574, 575, 90, 343

(56) References Cited

U.S. PATENT DOCUMENTS

| 5,115,182 A | * | 5/1992 | Ehmke et al. | 455/573 |
| 5,677,944 A | * | 10/1997 | Yamamoto et al. | 455/343 |
| 6,055,445 A | * | 4/2000 | Hiroki | 455/573 |

FOREIGN PATENT DOCUMENTS

| JP | 2-70546 | 5/1990 |
| JP | 4-137925 | 5/1992 |
| JP | 7-143052 | 6/1995 |
| JP | 8-64256 | 3/1996 |
| JP | 8-149711 | 6/1996 |
| JP | 8-340295 | 12/1996 |

* cited by examiner

Primary Examiner—Edward F. Urban
(74) Attorney, Agent, or Firm—Young & Thompson

(57) ABSTRACT

A charging system of a mobile telephone in which the current of lighting for the mobile telephone does not influence the control of charging of a charger using a car battery is provided. The mobile telephone provides an external connecting terminal connecting to the charger using a car battery and a battery connecting terminal connecting to a secondary battery. At the external connecting terminal of the mobile telephone, a power supply terminal for lighting is provided, the power supply to a lighting circuit of the mobile telephone is connected to either the secondary battery or the power supply terminal for lighting by a change-over switch controlled by a controller. The charger using a car battery provides a power supply for lighting besides a charging circuit. At the time when the mobile telephone is connected to the charger using a car battery, the power supply for lighting in the charger using a car battery is connected to the power supply terminal for lighting of the mobile telephone. The controller monitors the signal from a car battery mode detecting terminal, at the time when the controller detects the connection between the charger using a car battery and the mobile telephone, the controller directs the change-over switch to change the switch to the power supply terminal for lighting.

5 Claims, 3 Drawing Sheets

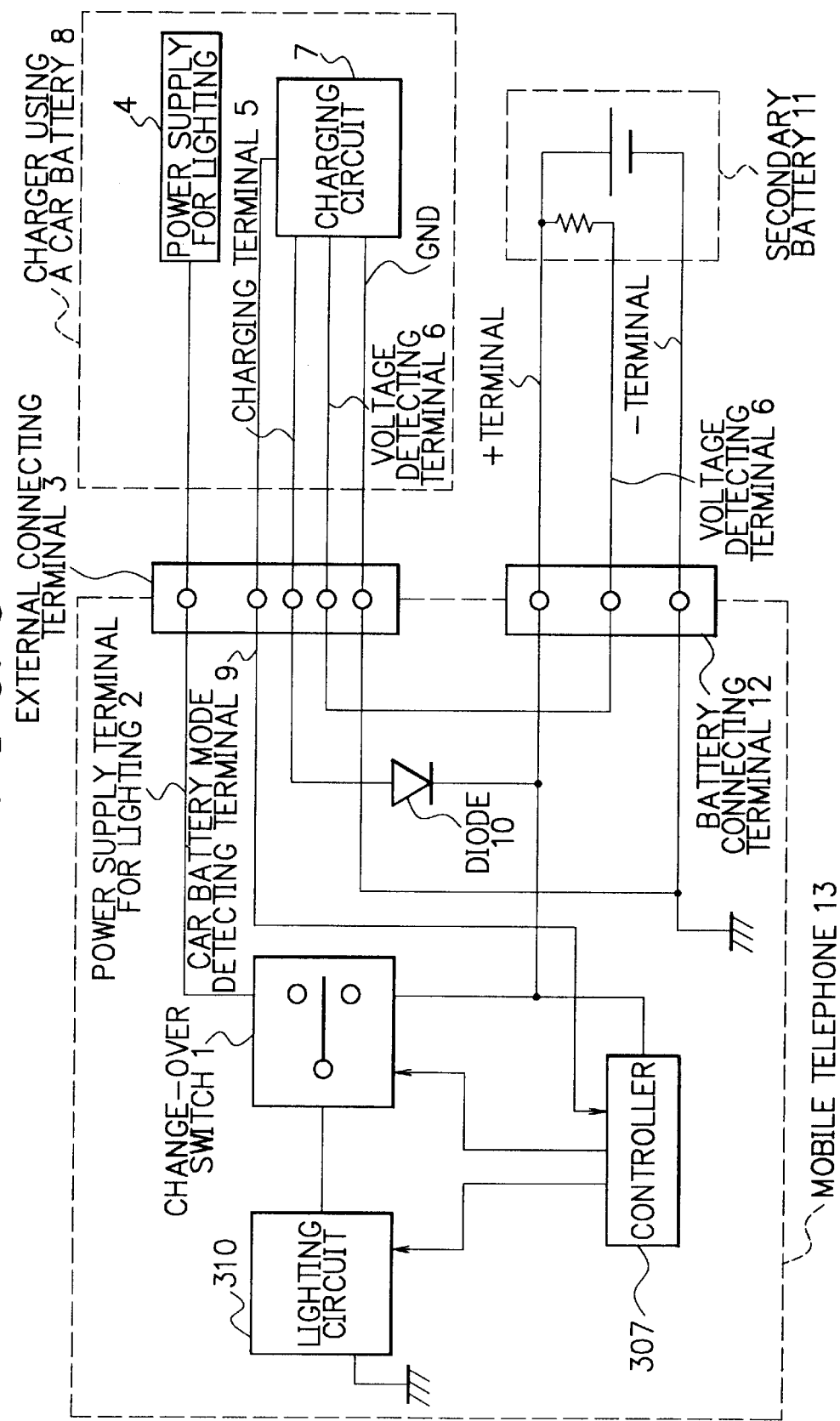

CHARGING SYSTEM OF MOBILE TELEPHONE

BACKGROUND OF THE INVENTION

The present invention relates to a charging system of a mobile telephone in which in particular a secondary battery being a power supply of the mobile telephone is charged by connecting with a charger using a car battery as a power source.

DESCRIPTION OF THE RELATED ART

FIG. 1 is a block diagram showing the general construction of a mobile telephone. In FIG. 1, a radio wave received at an antenna 301 is amplified at a radio section 302 and the frequency of the radio wave is converted at the radio section 302. The converted signal is demodulated at a modem 303 and further is decoded to a voice signal at a voice processing section 304 and after this the voice signal is reproduced at a speaker 305. On the other hand, a voice inputted from a microphone 306 is transmitted from the antenna 301 processed through the reverse route.

By the operation of an operating section 309, a controller 307 controls a radio channel, the processing of the received data, the voice processing section 304, the display information output of a display 308 and a lighting circuit 310.

The lighting circuit 310 is for example a back light for lighting the display 308 and the operating section 309. The lighting circuit is turned on by a user who operates the operating section 309 in order to make the operation of the mobile telephone possible at the dark place. However, at the case making the lighting circuit 310 always turn on, a battery is consumed, therefore the light is turned on only at the time when the user directs the turning on, and the user is not able to set that the light is always turning on.

However, at the case that the mobile telephone is connected to the charger using a car battery, the secondary battery is charged by the charger using a car battery. Therefore it is possible to make the lighting circuit 310 always turn on by the setting that the user directs the operating section 309 and makes the light always turn on.

As mentioned above, at the case that the mobile telephone is used with the combination of a charger using a car battery, the mobile telephone is usable even at the time during the secondary battery of the mobile telephone is charged by the charger using a car battery. At this case, the user can set to make the light of the display and operating section of the mobile telephone always turn on. However, at the case that the mobile telephone uses a lithium ion battery as a secondary battery, the charging is controlled by a charging current, therefore the current consumed for lighting increases compared with the case that the light of the display and operating section is not turned on, and there is a problem that the charging time becomes long.

It is also possible that the charging current detecting the finish of charging is set to be a large current beforehand by considering the current consumed at the lighting circuit. However, in this case, there is a problem that the charged quantity at the finishing time of charging becomes small in spite of that the charging time does not become longer.

FIG. 2 is a graph showing the characteristic of charging voltage of the secondary battery made of lithium ion. In order to protect the battery, the charging voltage must be controlled to be generally below 4.2 volts. The charging is generally set in the range between 0.1C and 1.5C, in this, C means the nominal capacity of battery. In FIG. 2, the charging of 1C is explained as an example.

The charging current 1C is used for the charging until the charged voltage reaches 4.2 volts. After the charged voltage reached 4.2 volts, the charging current decreases as time passes to make the charged voltage a constant value of 4.2 volts. The charging finishes by detecting the time when the charging current reaches a predetermined value. In this, the predetermined value is set about 0.18C and 92 to 93% of charging capacity.

At the case that the secondary battery being charged supplies the power to the power supply for lighting which is turning on state during the time that the secondary battery is charged, the current consuming at the lighting is added to the charging current. Therefore, at the case to make the charging finish with the predetermined charging current, the time until the charging finish becomes long. Moreover, there is a possibility that the life of the battery will be decreased by charged over the charging capacity being set by considering the battery life and safety.

In order to avoid the above mentioned phenomena, at the case that the charging current of the charging finish is set to a higher value, the charging time does not become longer, however there is a problem that the charged value at the time of the charging finish is lowered.

The Japanese Utility Model Application Laid-Open No. HEI 2-70546 discloses a cordless telephone which provides one master telephone connecting to a telephone line, two handsets connecting to the master telephone by radio communication and a charger. Each handset has a back light and a secondary battery which is charged by the charger. And a current supplying circuit for supplying the current from the charger to the back light of the handset is provided. The charger implements the charging to the secondary battery of the handset and also supplies the current to the back light of the handset during the time that the secondary battery is charged. Therefore, the back light is turning on state during the time that the secondary battery is charged. However, there is no description that the current supply lines are separately provided to the secondary battery and the back light. With this, there is a problem that the charging time will be increased.

The Japanese Patent Application Laid-Open No. HEI 8-64256 discloses a charging method that charges a secondary battery with a predetermined charging current until the charged voltage reaches a predetermined voltage. After the charged voltage reached the predetermined voltage, the charging current is decreased by making the charged voltage a predetermined constant voltage in the time passing. The charging is finished by detecting that the charging curent reaches the predetermined value. However, there is no description that the separate circuit for lighting of the display and operating section is provided during the time that the secondary battery is charged.

SUMMARY OF THE INVENTION

It is therefore an object of the present invention to provide a charging system of a mobile telephone at which a secondary battery is not used for the power supply of the lighting of the mobile telephone during the time that the secondary battery is charged.

According to a first aspect of the present invention, for achieving the above mentioned objects, at a charging system of a mobile telephone in which the mobile telephone provides a lighting circuit for lighting a display and an operating section and a secondary battery that is charged by a charger, said mobile telephone provides a power supply terminal for lighting, a change-over switch which connects either said power supply terminal for lighting or a battery connecting terminal to said lighting circuit and a controller which changes said change-over switch to said power supply terminal for lighting by detecting that the mobile telephone is connected to said charger. Said charger provides a charging circuit providing a control means which implements charging with a predetermined charging current until the charged voltage of said secondary battery reaches to a predetermined charged voltage, and makes the charging current decrease with time passing by making the charged voltage a predetermined constant value after the charged voltage reached said predetermined voltage value, and controls to finish charging by detecting that said charging current reached the predetermined value and a power supply for lighting which is provided as a separate line from the said charging circuit and is connected to said power supply terminal for lighting and supplies the current to said lighting circuit during the time that said charging circuit is charging said secondary battery.

According to a second aspect of the present invention, in the first aspect, said charger is a charger using a car battery.

According to a third aspect of the present invention, in the second aspect, said mobile telephone provides a car battery mode detecting terminal and said controller controls said change-over switch by receiving a signal from said car battery mode detecting terminal.

According to a fourth aspect of the present invention, a charger used with the combination of a mobile telephone providing a lighting circuit for lighting a display and an operating section, charges a secondary battery of said mobile telephone provides a charging circuit providing a control means which implements charging with a predetermined charging current until the charged voltage of said secondary battery reaches to a predetermined charged voltage, and makes the charging current decrease with time passing by making the charged voltage a predetermined constant value after the charged voltage reached said predetermined voltage value, and controls to finish charging by detecting that said charging current reached the predetermined value and a power supply for lighting which is provided as a separate line from the said charging circuit and is connected to said power supply terminal for lighting provided at said mobile telephone and supplies the current to said lighting circuit during the time that said charging circuit is charging said secondary battery.

According to a fifth aspect of the present invention, in the fourth aspect, said charger is a charger using a car battery.

BRIEF DESCRIPTION OF THE DRAWINGS

The objects and features of the present invention will become more apparent from the consideration of the following detailed description taken in conjunction with the accompanying drawings in which:

FIG. 3 is a block diagram showing an embodiment of the construction of the present invention.

DESCRIPTION OF THE PREFERRED EMBODIMENTS

Figure 1:
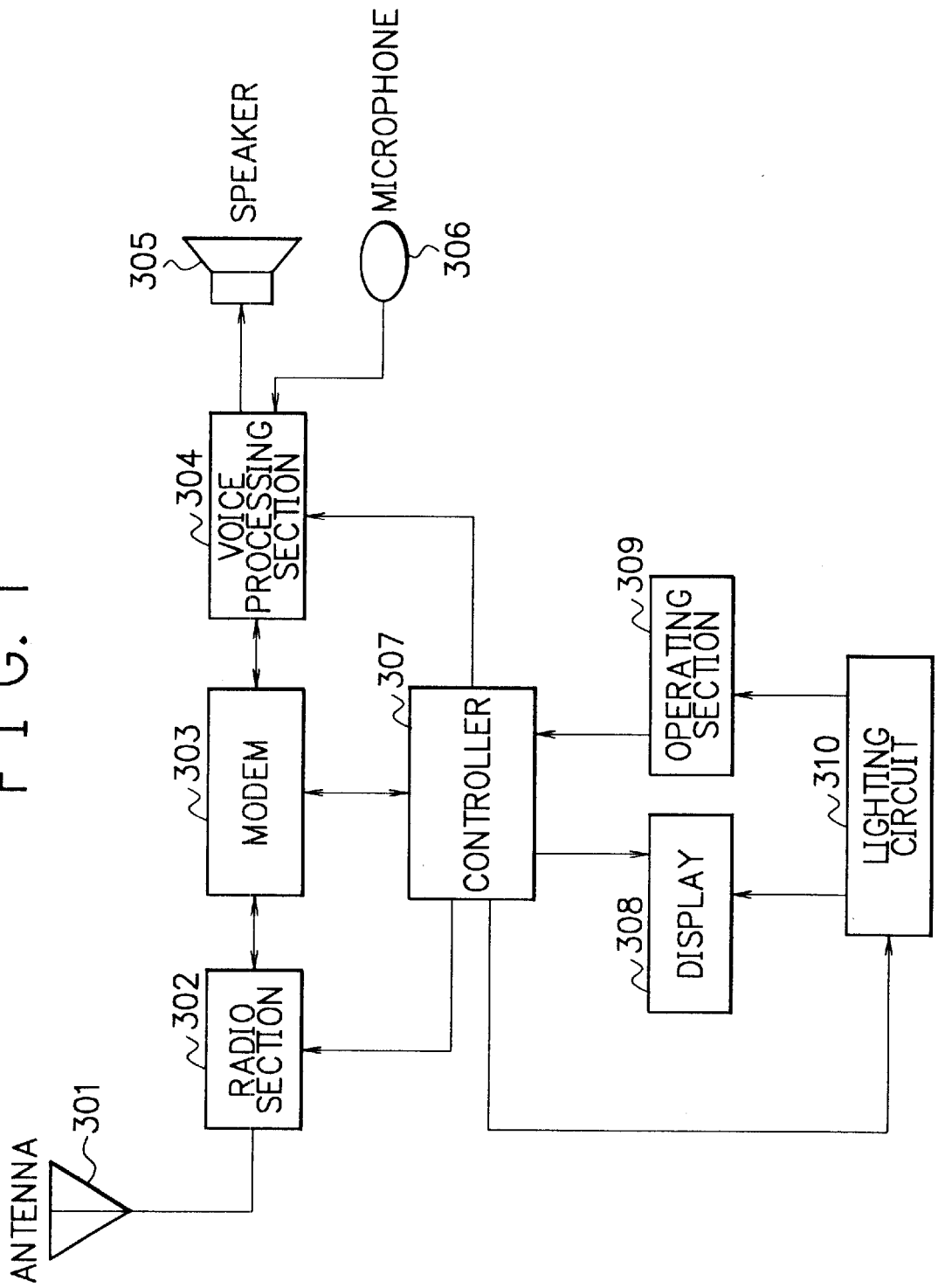
FIG. 1 is a block diagram showing the general construction of a mobile telephone.
Figure 2:
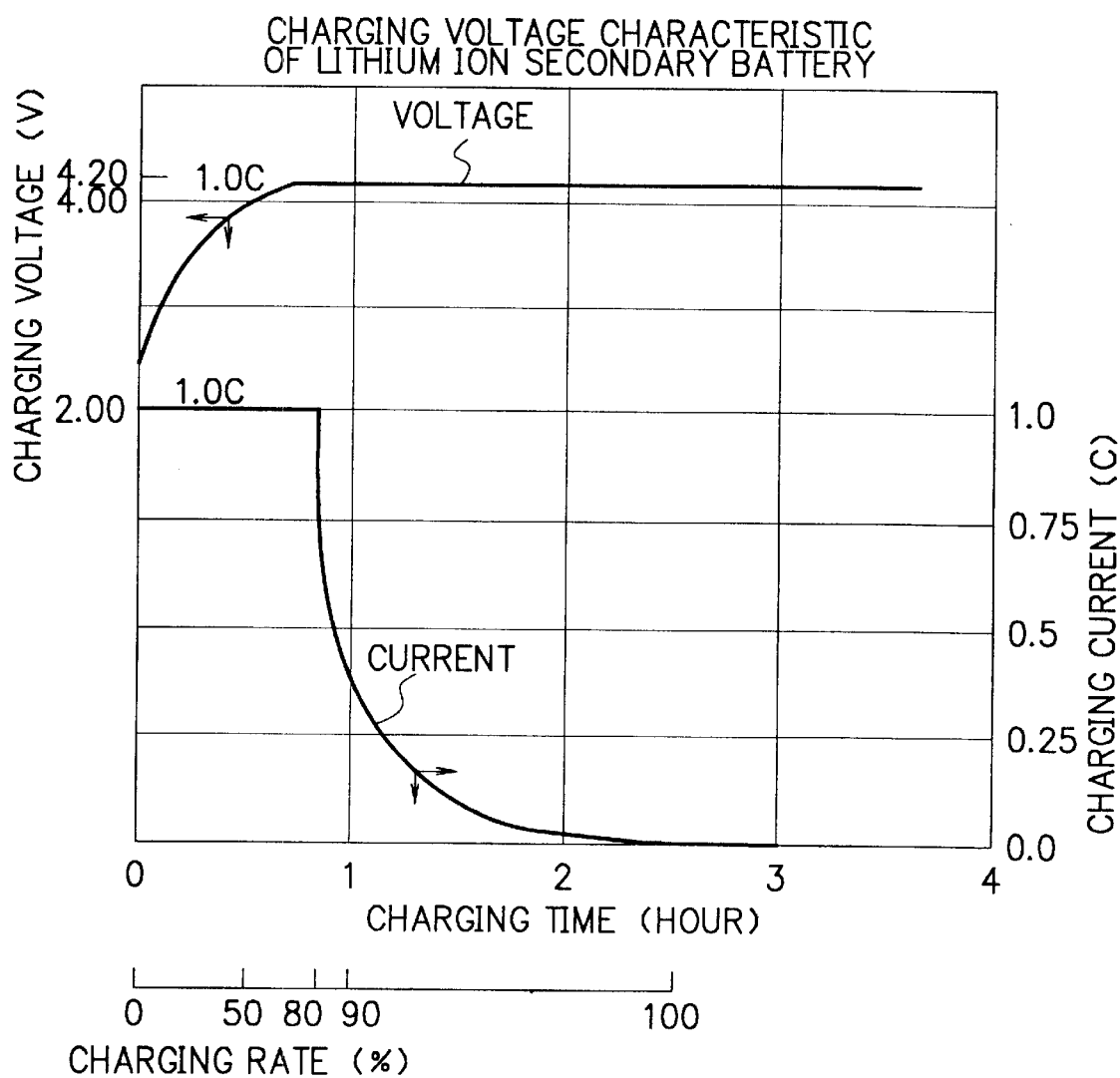
FIG. 2 is a graph showing the characteristic of charging voltage of the secondary battery made of lithium ion.

Referring now to the drawings, an embodiment of the present invention is explained in detail. FIG. 3 is a block diagram showing an embodiment of the construction of the present invention. In FIG. 3, a mobile telephone 13 provides an external connecting terminal 3 which connects to a charger using a car battery 8 and a battery connecting terminal 12 which connects to a secondary battery 11. The charger using car battery 8 connects to the mobile telephone 13 via the external connecting terminal 3 and the secondary battery 11 connects to the mobile telephone 13 via the battery connecting terminal 12.

The charger using a car battery 8 is connected to a car battery at the time when the charging is implemented.

A charging circuit 7 of the charger using a car battery 8 monitors the voltage of a voltage detecting terminal 6 connecting to the secondary battery 11 via the mobile telephone 13 and controls the current flowing in a charging terminal 5 to make the charging voltage 4.2 volts during the time that the secondary battery 11 is charged. And the charging is finished at the time that the charging current becomes a predetermined value.

At the case that the power supply of the mobile telephone 13 is in the on state, a small amount of current is consumed because of the standby state. The charging circuit 7 also supplies the current to the standby state. A diode 10 connected to the charging terminal 5 is a diode that protect the reverse current from the secondary battery 11 to the charging circuit 7.

The external connecting terminal 3 of the mobile telephone 13 provides a power supply terminal for lighting 2 and this power supply terminal 2 connects to a change-over switch 1. The power supplying to a lighting circuit 310 of the mobile telephone 13 is switched to either the secondary battery 11 or the power supply terminal for lighting 2 by the change-over switch 1, controlled by a controller 307.

The charger using a car battery 8 provides a power supply for lighting 4 besides the charging circuit 7. At the time when the mobile telephone 13 connects to the charger using a car battery 8, this power supply for lighting 4 connects to the power supply terminal for lighting 2 of the mobile telephone 13.

The controller 307 monitors the signal from a car battery mode detecting terminal 9. At the time when the charger using a car battery 8 is not connected to the external connecting terminal 3 of the mobile telephone, the controller 307 changes the change-over switch 1 to the secondary battery 11 and controls the lighting circuit 310 of the mobile telephone 13 not to be set the lighting to be on state at all times by a user. At the time when the controller 307 detects the connection between the charger using a car battery 8 and the mobile telephone 13, the controller 307 changes the change-over switch 1 to the power supply terminal for lighting 2 and controls to set that a user can set the lighting to be on state at all times.

As mentioned above, even at the case that a user sets the lighting on state at all times under the state that the secondary battery 11 is charged by the charger using a car battery 8, the driving current of the lighting circuit 310 is supplied from the power supply for lighting 4 via the power supply terminal for lighting 2. Therefore, the influence of the lighting circuit 310 to the current flowing to the charging circuit 7 is not able to occur.

In the above mentioned embodiment, the case used the charger using a car battery is explained, however this embodiment is applicable for any charger for example a charger using commercial power.

According to the present invention, at the case using the charger using a car battery, the power supply for the lighting is supplied from the power supply terminal only for this purpose by changing the change-over switch, therefore the current for the lighting does not influence the control of the charger using a car battery. The charging to the secondary battery is able to be achieved at the same level of charging quantity in the same time as the lighting is turned off, even at the state that the lighting is turned on at all times.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A charging system of a mobile telephone in which the mobile telephone provides a lighting circuit for lighting a display and an operating section, and a secondary battery that is charged by a charger, wherein, said mobile telephone, comprising:

a power supply terminal for lighting;

a change-over switch which connects either said power supply terminal for lighting or a battery connecting terminal to said lighting circuit; and a controller which changes said change-over switch to said power supply terminal for lighting by detecting that the mobile telephone is connected to said charger;

wherein, said charger, comprising:

a charging circuit providing a control means which implements charging with a predetermined charging current until the charged voltage of said secondary battery reaches to a predetermined charged voltage, and makes the charging current decrease with time passing by making the charged voltage a predetermined constant value after the charged voltage reached said predetermined voltage value, and controls to finish charging by detecting that said charging current reached the predetermined value; and a power supply for lighting which is provided as a separate line from the said charging circuit and is connected to said power supply terminal for lighting and supplies the current to said lighting circuit during the time that said charging circuit is charging said secondary battery.

2. A charging system of a mobile telephone in accordance with claim 1, wherein:

said charger is a charger using a car battery.

3. A charging system of a mobile telephone in accordance with claim 2, wherein, said mobile telephone comprising:

a car battery mode detecting terminal and said controller controls said change-over switch by receiving a signal from said car battery mode detecting terminal.

4. A charger for charging a secondary battery of a mobile telephone of the type which includes a lighting circuit for lighting a display and an operating section, comprising:

a charging circuit having a controller for
  a) charging said secondary battery with a first charging current until a predetermined charged voltage of said secondary battery is reached,
  b) charging said secondary battery with a second charging current after reaching said predetermined charged voltage, said second charging current decreasing with time relative to said first charging current and
  c) terminating charging with said second charging current upon detecting that said second charging current reaches a predetermined value; and a power supply for said lighting a line separate from said charging circuit and is connectable to a power supply terminal provided at said mobile telephone, said power supply being provided to supply current through said power supply terminal to said lighting circuit during the time that said charging circuit is charging said secondary battery.

5. A charger in accordance with claim 4, wherein:

said charger is a charger using a car battery.

* * * * *